US00RE42048E

(19) United States
(12) Reissued Patent
Gehlsen et al.

(10) Patent Number: US RE42,048 E
(45) Date of Reissued Patent: Jan. 18, 2011

(54) LINERLESS DOUBLE-SIDED PRESSURE SENSITIVE ADHESIVE TAPE

(75) Inventors: Mark D. Gehlsen, Cottage Grove, MN (US); Peter A. Stark, Cottage Grove, MN (US); Bradley S. Momchilovich, New Richmond, WI (US)

(73) Assignee: 3M Innovative Properties Company, Saint Paul, MN (US)

(21) Appl. No.: 11/715,292

(22) Filed: Mar. 7, 2007

Related U.S. Patent Documents

Reissue of:
(64) Patent No.: 6,864,322
Issued: Mar. 8, 2005
Appl. No.: 10/600,983
Filed: Jun. 20, 2003

(51) Int. Cl.
*C08L 33/08* (2006.01)

(52) U.S. Cl. ..... 525/227; 428/41.4; 428/355 AC; 428/355 CN; 428/343

(58) Field of Classification Search ..... 525/227; 428/41.4, 355 AC, 355 CN, 343
See application file for complete search history.

(56) References Cited

U.S. PATENT DOCUMENTS

| | | | | |
|---|---|---|---|---|
| 2,884,126 | A * | 4/1959 | Ulrich | |
| RE24,906 | E | 12/1960 | Ulrich | |
| 3,008,850 | A | 11/1961 | Ulrich | |
| 4,181,752 | A | 1/1980 | Martens et al. | |
| 5,753,768 | A | 5/1998 | Ellis | |
| 5,840,783 | A | 11/1998 | Momchilovich et al. | |
| 6,294,249 | B1 | 9/2001 | Hamer et al. | |
| 2002/0004130 | A1 * | 1/2002 | Lhila | 428/317.1 |

FOREIGN PATENT DOCUMENTS

| | | |
|---|---|---|
| EP | 0121430 | 10/1984 |
| WO | WO-9723577 | 7/1997 |
| WO | WO-9942536 | 8/1999 |
| WO | WO-03011588 | 2/2003 |

OTHER PUBLICATIONS

PCT International Search Report, dated Sep. 9, 2004. (3 pages).

* cited by examiner

*Primary Examiner*—William K Cheung
(74) *Attorney, Agent, or Firm*—Julie A. Lapos-Kuchar; Daniel M. Pauly

(57) ABSTRACT

The present invention relates to a double-sided pressure sensitive adhesive foam tape. In certain embodiments the foam tape does not require the use of a release liner. Elimination of the release liner reduces the cost of the tape and also avoids problems associated with damage to the liner during traditional tape manufacturing from exposure to e-beam radiation.

28 Claims, 1 Drawing Sheet

LINERLESS DOUBLE-SIDED PRESSURE SENSITIVE ADHESIVE TAPE

Matter enclosed in heavy brackets [ ] appears in the original patent but forms no part of this reissue specification; matter printed in italics indicates the additions made by reissue.

*RELATED APPLICATIONS*

*This Application is a reissue application of U.S. Pat. No. 6,864,322, which issued on Mar. 8, 2005. The entire content of this U.S. patent is incorporated herein by reference.*

FIELD OF THE INVENTION

The present invention relates to adhesive tapes, more specifically to pressure sensitive adhesive tapes. In particular, the invention relates to double-sided pressure sensitive adhesive tapes.

BACKGROUND

Pressure sensitive adhesive (PSA) compositions are used in a wide variety of applications. Numerous applications require pressure sensitive adhesives to support a load at elevated temperatures, typically in the range of greater than 70° C., for which high cohesive strength PSAs are required. A standard method of increasing cohesive strength at elevated temperatures is to chemically crosslink the PSA using irradiation processes, such as thermal radiation, ultraviolet (UV) radiation, gamma radiation, and electron beam (EB) radiation, etc. Although these processes improve cohesive strength, they often negatively impact other properties, including peel strength of the PSA.

PSA compositions have been used as tapes, in particular as double-sided tapes used to adhere two articles together. Such double-sided PSA tapes are useful, for example, in automotive manufacturing, numerous consumer products, construction, and for maintenance and repair of many items. Most conventional double-sided PSA tapes typically require that at least one side of the tape be covered with a release liner to prevent the two sides from sticking together. Although such release liners are functional, they have the disadvantage of being time consuming to use, as well as adding expense to the PSA tape and waste to its application.

For some applications, PSAs formed into foams are desirable because tapes made of foam can conform better to certain substrates, thereby giving better adhesion and greater holding power. Foamed PSA tapes are particularly desirable on irregular shaped surfaces that would not otherwise provide an adequate surface with which to contact the PSA.

Therefore, a need exists for an improved PSA tape that does not require irradiation, and which advantageously can be produced without the use of a release liner on one or both major surfaces, and which includes a foam to improve adhesion to irregular surfaces.

SUMMARY OF THE INVENTION

The present invention relates to a double-sided pressure sensitive adhesive foam tape. In certain embodiments the foam tape does not require the use of a release liner. Elimination of the release liner reduces the cost of the tape and also avoids problems associated with damage to the liner during traditional tape manufacturing from exposure to e-beam radiation. The double-sided pressure sensitive adhesive foam tape is produced, in specific implementations, without e-beaming to cure the adhesives, although the tape can be e-beamed in alternate implementations.

In a first aspect of the invention the foam tape comprises a foam core comprising an acidic polymer derived from at least one acidic monomer and a basic polymer derived from at least one basic monomer to form an ionically crosslinked polymeric network (ICPN). A first pressure sensitive adhesive is applied to one surface of the foam core; and a second pressure sensitive adhesive applied to a second surface of the foam core. In one embodiment, the first and second pressure sensitive adhesives do not substantially adhere to one another, i.e. when the two pressure sensitive adhesives are brought into contact with each other they can be separated without causing cohesive failure of the foam or delamination of either the first or second pressure sensitive adhesive from the foam.

The acidic monomer of the ICPN can be, for example, an ethylenically unsaturated carboxylic acid, an ethylenically unsaturated sulfonic acid, an ethylenically unsaturated phosphonic acid, and mixtures thereof. In some implementations the basic monomer is selected from the group consisting of N,N-dimethylaminopropyl methacrylamide (DMAPMAm), N,N-diethylaminopropyl methacrylamide (DEAPMAm), N,N-dimethylaminoethyl acrylate (DMAA), N,N-diethylaminoethyl acrylate (DEAEA), N,N-dimethylaminopropyl acrylate (DMAPA), N,N-diethylaminopropyl acrylate (DEAPA), N,N-dimethylaminoethyl methacrylate (DMAEMA), N,N-diethylaminoethyl methacrylate (DEAEMA), N,N-dimethylaminoethyl acrylamide (DMAEAm), N,N-dimethylaminoethyl methacrylamide (DMAEMAm), N,N-diethylaminoethyl acrylamide (DEAEAm), N,N-diethylaminoethyl methacrylamide (DEAEMAm), 4-(N,N-dimethylamino)-styrene (DMAS), 4-(N,N-diethylamino)-styrene (DEAS), N,N-dimethylaminoethyl vinyl ether (DMAEVE), N,N-diethylaminoethyl vinyl ether (DEAEVE), vinylpyridine, vinylimidazole, and mixtures thereof.

Various pressure sensitive adhesives can be used with the invention. In some implementations the first pressure sensitive adhesive comprises acrylic acid, and the second pressure sensitive adhesive comprises acrylic acid and acrylonitrile. These two pressure sensitive adhesives can be selected such that they do not adhere to one another; yet readily adhere to the ICPN-containing foam core.

The invention is also directed to a double-sided foam tape comprising a foam core having first and second opposed surfaces in which a first pressure sensitive adhesive is applied to the first surface of the foam core, the first pressure sensitive adhesive comprising acrylic acid; and a second pressure sensitive adhesive applied to the second surface of the foam core, the second pressure sensitive adhesive comprising acrylic acid and acrylonitrile. The first and second pressure sensitive adhesives do not substantially adhere to one another; and the foam core is configured to bond to the first pressure sensitive adhesive and to the second pressure sensitive adhesive.

Yet another aspect of the invention is directed to a double-sided foam tape, the foam tape comprising a foam core having first and second opposed surfaces, the foam core comprising an acidic copolymer derived from a first group of monomers comprising at least one acidic monomer, and a basic copolymer derived from a second group of monomers comprising at least one basic monomer. A first pressure sensitive adhesive is applied to the first surface of the foam core, the first pressure sensitive adhesive comprising acrylic acid; and a second pressure sensitive adhesive is applied to the second surface of the foam core, the second pressure sensitive adhesive comprising acrylic acid and acrylonitrile.

Again, the first and second pressure sensitive adhesives do not substantially adhere to one another.

Other features and advantages of the invention will be apparent from the following detailed description of the invention and the claims. The above summary of principles of the disclosure is not intended to describe each illustrated embodiment or every implementation of the present disclosure.

BRIEF DESCRIPTION OF THE FIGURE

Other aspects and advantages of the invention will become apparent upon reading the following detailed description and upon reference to the drawing in which:

FIG. 1 shows the tensile and elongation properties of ICPN foam samples containing 0% (CI), 2% (Example 1), 4% (Example 2), and 6% (Example 3) of an amine-containing polymer (referred to herein as "PIC"). In addition, a sample of 3M Microfoam™ tape is shown as a comparison. This plot demonstrates that by controlling the level of PIC (i.e., the ratio of the polymers of the ICPN) in the foam the properties of the foam can be modified to meet the performance requirements of the product.

Figure 1:
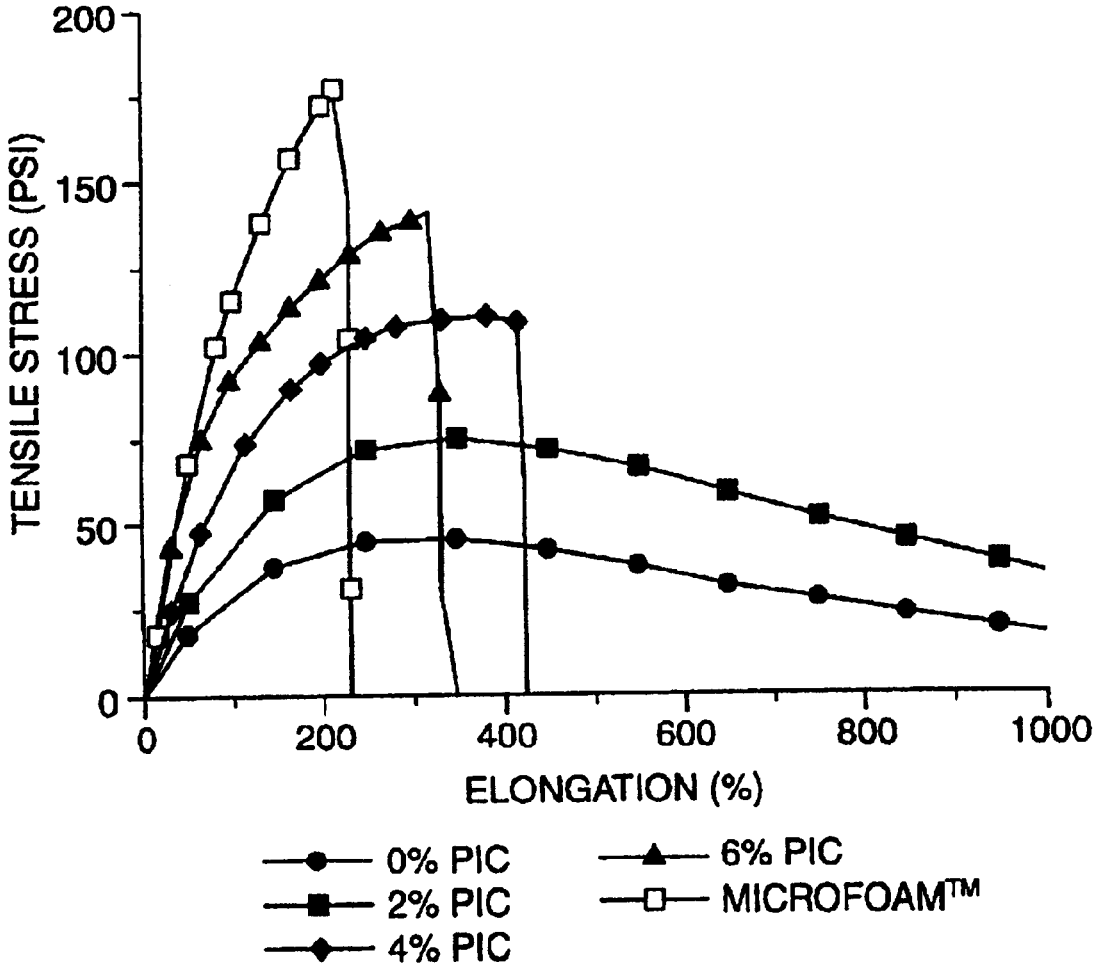
FIG. 1, is a graph showing the tensile and elongation properties of various double-sided pressure sensitive tapes. In particular.

While the invention is susceptible to various modifications and alternative forms, specifics thereof have been shown by way of example in the figure and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is directed to a double-sided pressure sensitive adhesive foam tape. In certain embodiments the foam tape does not require the use of a release liner, although a liner may be used if desired. Elimination of the liner reduces the cost of the tape, and also avoids problems associated with e-beaming damage to the liner during traditional tape manufacturing. The double-sided pressure sensitive adhesive foam tape is produced, in specific implementations, without e-beaming to cure the adhesives, although the tape can be e-beamed in alternate implementations.

Specific components of the double-sided pressure sensitive adhesive tape will now be described in greater detail, including a discussion of the foam core and the adhesives used to form the adhesive tape, plus examples of adhesive tapes produced in accordance with the invention.

I. Foam Core

The foam core of double-sided tapes made in accordance with the present invention typically comprises a blend of at least one acidic polymer and at least one basic polymer to form an ionically crosslinked polymeric network. Thermally reversible chemical crosslinks form as part of a network of polymeric ionic crosslinks between the acidic polymer and the basic polymer, allowing the composition forming the foam core to be easily hot-melt processed, but provide improved cohesive strength to foams containing the crosslinker after its application and cooling.

The acidic polymer is generally derived from at least one acidic monomer. In some implementations the acidic monomer is selected from ethylenically unsaturated carboxylic acids, ethylenically unsaturated sulfonic acids, ethylenically unsaturated phosphonic acids, and mixtures thereof. Suitable acidic monomers include, for example, ethylenically unsaturated carboxylic acids. When even stronger acids are desired, particularly preferred acidic monomers include the ethylenically unsaturated sulfonic acids and ethylenically unsaturated phosphonic acids.

In some implementations the acidic polymer is an acidic (meth)acrylate copolymer in which the acidic (meth)acrylate copolymer is derived from at least one acidic monomer and at least one (meth)acrylate monomer selected from the group consisting of monofunctional unsaturated (meth)acrylate esters of non-tertiary alkyl alcohols, and mixtures thereof, the alkyl groups of which comprise from about 1 to about 20 carbon atoms, preferably about 1 to about 18 carbon atoms, such as those of Formula (I):

Formula (I)

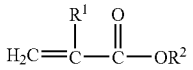

wherein $R_1$ is H or $CH_3$, the latter corresponding to where the (meth)acrylate monomer is a methacrylate monomer, and $R_2$ is a linear, branched, aromatic, or cyclic hydrocarbon group.

The basic polymer is generally derived from at least one basic monomer. Suitable basic monomers include, for example non-nucleophilic amine-functional monomers, such as those of Formula (II):

Formula (II)

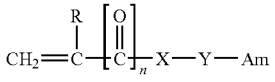

wherein a is 0 or 1;

R is selected from H— and $CH_3$—,

X is selected from —O— and —NH—;

Y is a divalent linking group, preferably comprising about 1 to about 5 carbon atoms for ease of availability; and Am is a tertiary amine fragment, such as the group:

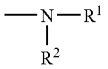

wherein $R^1$ and $R^2$ are selected from alkyl, aryl, cycloalkyl, and arenyl groups. $R^1$ and $R^2$ in the above group may also form a heterocycle. Alternatively, Am can be pyridinyl or imidazolyl, substituted or unsubstituted. In all embodiments, Y, $R^1$, and $R^2$ may also comprise heteroatoms, such as O, S, N, etc.

Exemplary basic monomers include, but are not limited to, N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), and mixtures thereof.

In some implementations the basic polymer is a copolymer derived from at least one basic monomer and at least one non-basic copolymerizable monomer. Other monomers can be copolymerized with the basic monomers (e.g., acidic monomers, vinyl monomers, and (meth)acrylate monomers), as long as the basic copolymer retains its basicity (i.e., it can still be titrated with an acid). Typically, the copolymerizable monomers are essentially free of acidic monomers (i.e., the copolymerizable monomers include about 5 wt. % or less of acidic monomers, but most preferably, the copolymerizable monomers are free of acidic monomers).

The basic copolymer can be, for example, a basic (meth) acrylate copolymer. In this embodiment, the basic (meth) acrylate copolymer is derived from at least one monomer of Formula 1. In one embodiment, the foam composition comprises a blend of: an acidic copolymer derived from a first group of monomers comprising at least one acidic monomer; and a basic copolymer derived from a second group of monomers comprising at least one basic monomer, such as those described in Formula (II), wherein at least one of the first and second group of monomers comprises greater than about 15% by weight of acidic or basic monomers, respectively. That is, the acidic copolymer is derived from at least 15% by weight of acidic monomers and/or the basic copolymer is derived from at least 15% by weight of basic monomers, based on total weight of the respective monomers. In certain embodiments at least one of the first and second group of monomers comprises at least about 25% by weight, more preferably at least about 35% by weight, even more preferably at least about 50% by weight, and most preferably at least about 60% by weight of the respective acidic or basic monomers. Advantageously each of the acidic copolymer and the basic copolymer are derived from monomers comprising at least one (meth)acrylate monomer, such as an alkyl (meth)acrylate monomer. Although more may be used, in certain embodiments, one of the acidic copolymer and the basic copolymer advantageously need only comprise up to about 5% by weight of the blend, typically about 0.5% to about 5% by weight of the blend.

In another embodiment, the foam composition comprises a blend of an acidic homopolymer and a basic copolymer derived from a group of monomers comprising at least one basic monomer. In certain variations of this embodiment, the group of monomers comprises at least about 15% by weight of basic monomers; although lower amounts may also be used. Advantageously, although more may be used, the acidic homopolymer need only comprise as little as up to about 5% by weight of the blend, most typically about 0.5% by weight to about 5% by weight of the blend, in order to achieve foam cores having cohesive strengths suitable for intended applications.

In yet another embodiment, the foam composition comprises a blend of: an acidic copolymer derived from monomers comprising at least one monomer selected from the group consisting of an ethylenically unsaturated sulfonic acid, an ethylenically unsaturated phosphonic acid, and mixtures thereof and at least one non-acidic copolymerizable monomer; and a basic homopolymer.

One suitable polymer for the ICPN composition includes the copolymer of 40/60 2-ethylhexylacrylate/dimethylaminoethylmethacrylate (2EHA/DMAEMA). Other suitable ratios include, for example, 30/70 and 20/80 ratios of 2-ethylhexylacrylate to dimethylaminoethylmethacrylate. Other suitable polymers are described in WO 99/42536, which is herein incorporated by reference.

The foam core can include a plurality of expanded polymeric microspheres to form the foam. The foam may also include one or more non-expandable microspheres, which may be polymeric or non-polymeric microspheres (e.g., glass microspheres). The expandable microspheres typically feature a flexible, thermoplastic, polymeric shell and a core that includes a liquid and/or gas that expands upon heating. The core material is generally an organic substance that has a lower boiling point than the softening temperature of the polymeric shell. Examples of suitable core materials include, but are not limited to, propane, butane, pentane, isobutane, neopentane, and combinations thereof. Preferred core materials are materials other than air that expand upon heating. Microspheres suitable for use with the invention usually have an activation temperature below the temperature needed to melt mix the copolymer and the polyarylene oxide polymer. Thus, the activation temperature is generally less than 200° C., more typically less than 170° C.

The choice of thermoplastic resin for the polymeric shell of the microspheres influences the mechanical properties of the foam. Accordingly, the properties of the foam may be adjusted through appropriate choice of microspheres, or by using mixtures of different types of microspheres. For example, acrylonitrile-containing resins are useful where high tensile and cohesive strength are desired, particularly where the acrylonitrile content is at least 50% by weight of the resin, more preferably at least 60% by weight, and even more preferably at least 70% by weight. In general, both tensile and cohesive strength increase with increasing acrylonitrile content. In some cases, it is possible to prepare foams having higher tensile and cohesive strength than the polymer matrix alone, even though the foam has a lower density than the matrix. This provides the capability of preparing high strength, low density articles.

The amount of expandable microspheres can be selected based upon the desired properties of the foam tape. Higher microsphere concentrations generally cause lower density of the foam. The amount of microspheres generally ranges from about 0.1 parts by weight to about 50 parts by weight (based upon 100 parts of polymer mixture), more typically from about 0.5 parts by weight to about 20 parts by weight.

Alternatively, or in conjunction with expandable microspheres, the pressure sensitive adhesive tapes of the invention may be formed into a foam by use of blowing agents, including chemical blowing agents and physical blowing agents. Use of blowing agents instead of expandable microspheres to form a foam tends to make the resulting foam more susceptible to irreversible collapse under pressure. This feature may be desirable in some applications where conformity to irregular surfaces is desired.

Physical blowing agents useful in the present invention include various naturally occurring atmospheric materials that are a vapor at the temperature and pressure at which the foam exits the die. The physical blowing agent may be introduced into the polymeric material as a gas or liquid, preferably as a liquid, and may be introduced in a supercritical state. Suitable physical blowing agents include, for example, carbon dioxide, nitrogen, $SF_6$, nitrous oxide, perfluorinated fluids, such as $C_2F_6$, argon, helium, noble gases, such as xenon, air (nitrogen and oxygen blend), and blends of these materials.

Chemical blowing agents may also be added to the melt mixture. Suitable chemical blowing agents include, for example, a blend of sodium bicarbonate and citric acid, dinitrosopentamethylenetetramine, p-toluenesulfonyl hydrazide, 4—4'-oxybis(benzenesulfonyl hydrazide, azodicarbonamide (1,1'-azobisformamide), p-toluenesulfonyl semicarbazide, 5-phenyltetrazole, 5-phenyltetrazole analogues, diisopropylhydrazodicarboxylate, 5-phenyl-3,6-dihydro-1,3,4-oxadiazin-2-one, and sodium borohydride.

II. Pressure Sensitive Adhesives

The double-sided pressure sensitive tape typically contains a different pressure sensitive adhesive on each side of the tape. The pressure-sensitive adhesive compositions (referred to herein as the first PSA (PSA-1) and second PSA (PSA-2)) useful in this invention can be in the form of solutions, emulsions, or dispersions, or as solventless adhesive compositions. A first PSA includes acrylate and methacrylate polymers or copolymers that do not contain acrylonitrile or methacrylonitrile. Such polymers can be formed by polymerizing 50 to 100 parts by weight of one or more monomelic acrylic or methacrylic esters of non-tertiary alkyl alcohols, with the alkyl groups having from 1 to 20 carbon atoms (e.g. from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates, e.g., benzyl acrylate and cyclobenzyl acrylate. Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include, but are not limited to, acrylic acid, acrylamide, methacrylamide, substituted acrylamides such as N,N-dimethyl acrylamide, itaconic acid, methacrylic acid, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates", vinylidene chloride, styrene, vinyl toluene, and alkyl vinyl ethers.

A second group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and a methoxypolyethylene glycol 400 acrylate (Tg=−65° C.; available from Shin Nakamura Chemical Co., Ltd. under the designation "NK Ester AM-90G"). [See, e.g., Ulrich, U.S. Pat. No. 2,884,126; Martens U.S. Pat. No. 4,181,752; Hamer U.S. Pat. No. 6,294,249; and Ellis U.S. Pat. No. 5,753,768].

The second PSA can include acrylate and methacrylate copolymers that contain acrylonitrile or methacrylonitrile. Such polymers can be formed by polymerizing 50 to 100 parts by weight of one or more monomeric acrylic or methacrylic esters of non-tertiary alkyl alcohols, with the alkyl groups having from 1 to 20 carbon atoms (e.g. from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates, e.g., benzyl acrylate and cyclobenzyl acrylate. Optionally, one or more monoethylenically unsaturated co-monomers may be polymerized with the acrylate or methacrylate monomers; the particular amount of co-monomer is selected based upon the desired properties of the polymer. One group of useful co-monomers includes those having a homopolymer glass transition temperature greater than the glass transition temperature of the acrylate homopolymer. Examples of suitable co-monomers falling within this group include, but are not limited to, acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates", vinylidene chloride, styrene, vinyl toluene, and alkyl vinyl ethers.

A second group of monoethylenically unsaturated co-monomers which may be polymerized with the acrylate or methacrylate monomers includes those having a homopolymer glass transition temperature less than the glass transition temperature of the acrylate homopolymer. Examples of suitable co-monomers falling within this class include ethyloxyethoxy ethyl acrylate (Tg=−71° C.) and a methoxypolyethylene glycol 400 acrylate (Tg=−65° C.; available from Shin Nakamura Chemical Co., Ltd. under the designation "NK Ester AM-90G"). [See e.g., Ulrich, U.S. Pat. No. 3,008,850; Martens U.S. Pat. No. 4,181,752; Hamer U.S. Pat. No. 6,294,249; and Ellis U.S. Pat. No. 5,753,768].

III. Other Additional Ingredients

Additional ingredients may be added to augment properties of the pressure-sensitive adhesive foam. These include, for example, a relatively high modulus polymer that can stiffen the foam. Suitable polymers include, e.g., semicrystalline polymers such as polyamides and polyesters, and relatively low modulus polymer compositions that can increase the flexibility of the article, e.g., plasticized polyvinyl chloride. Relatively immiscible polymer compositions can act to form fibrous networks to further reinforce the cohesive strength of the article when the immiscible phases are elongated under stretching forces. Examples of such structures containing fiber-like reinforcing networks are disclosed in WO 97/23577 "Blended Pressure-Sensitive Adhesives", which is incorporated herein by reference.

The foamed pressure sensitive adhesive may contain agents in addition to microspheres, the choice of which is dictated by the properties appropriate for the intended application of the article. Examples of suitable additives include, but are not limited to, tackifiers (e.g., rosin esters, terpenes, phenols, and aliphatic, aromatic, or mixtures of aliphatic and aromatic synthetic hydrocarbon resins), plasticizers, oils, pigments, dyes, non-expandable polymeric or glass microspheres, reinforcing agents, hydrophobic or hydrophilic silica, calcium carbonate, toughening agents, fire retardants, antioxidants, finely ground polymeric particles such as polyester, nylon, or polypropylene, stabilizers, and combinations thereof. These additives are included in amounts sufficient to obtain the desired end properties.

The invention will now be more particularly illustrated by the following examples, which are not intended to be limiting in any way.

IV. EXAMPLES

A. Test Methods

Density

The densities of the foams of the invention were measured using the following procedure. Samples of the foam were cut into 13 mm×25 mm pieces, weighed on a Mettler high precision balance and then placed underwater. The mass of the displaced water was measured. The water temperature was approximately 25° C. Using the density of the water as 1 g/cm$^3$, the mass of the displaced water divided by the density of the water gives the volume of the sample. The mass of the sample is then divided by the volume of the sample to generate the density of the sample. Two replicates were measured and averaged together.

Static Shear

The bond strengths (in shear mode) of the tapes of the invention to a standard aluminum panel were measured using the following procedure. A 1.3 cm (0.5 in) wide piece of tape with a release liner on one side and exposed adhesive on the other side was adhered to a 1.6 cm wide strip of a 0.127 mm thick aluminum foil. The release liner was then removed from the non-adhered side and the tape was then adhered to a clean rigid anodized aluminum panel using four passes of a 2 kg (4.5 lb) hard rubber roller such that a 1.3 cm by 2.5 cm portion of the tape was in firm contact with the panel. A non-adhered end portion of the tape extended beyond the panel. The panel was then hung in a constant temperature and humidity chamber (22° C.; 50% relative humidity). The panel was positioned 2 degrees from the vertical to prevent a peel mode failure. A 1000 gram weight was then hung from the non-adhered end of the tape sample and the time required for the weight to fall off was recorded in minutes. If no failure occurred within 10,000 minutes, the test was discontinued and results were recorded as 10,000+ minutes. If the tape fell off in fewer than 10,000 minutes, the time was recorded and the mode of failure noted as either cohesive failure within the adhesive, or an adhesive failure when the adhesive pulled cleanly from the panel. All examples exhibited adhesive failure. Three replicates were measured and averaged together.

Adhesive Anchorage

The bond strength of the pressure sensitive adhesive layers to the foam core was measured using the following procedure. The double-sided foam tapes were conditioned for 48 hours at 23° C. and 50% humidity. Strips of anodized aluminum foil were laminated to both sides of the foam tape using two passes of a 2.3 kilogram hard rubber roller rolled at 30.5 cm/min followed by 24 hour conditioning at 23° C. and 50% humidity. The aluminum strips were peeled away from the foam tape at a 180 degree angle. If the aluminum strip pulled the adhesive away from the foam core the test result was recorded as FAIL, indicating that the bond of the adhesive to the foil was greater than the bond of the adhesive to the foam core. If the foam core itself underwent cohesive failure then the test result was recorded as PASS.

Stress-strain Properties

The mechanical properties of the foam cores were measured according to ASTM D-638 using an INSTRON Tensile Tester (Instron Corp., Canton, Mass.). The foam cores were conditioned for 48 hours at 23° C. and 50% humidity. Type IV dogbone shape specimens were die cut from the foam cores having dimensions of 2.54 cm by 1.27 cm in the narrow test section. The thickness of the specimens in the narrow test section was measured and recorded. The specimens were mounted into the tensile tester and elongated to their break point at a crosshead speed of 25.4 cm/min. The maximum stress and elongation at the maximum stress were recorded. Three replicates were measured and averaged together.

Example 1

A double-sided pressure sensitive adhesive tape was produced by first extruding a foam core layer consisting of a blend of 90 parts of isooctyl acrylate, 10 parts of acrylic acid, 0.006 parts of 2,2' azobis(2,4-dimethylpentanenitrile) (VAZO 52, Dupont, Wilmington, Del.), 0.0028 parts 2,2' azobis(cyclohexanecarbonitrile) (VAZO 88, Dupont, Wilmington, Del.), 0.004 parts di-t-amyl peroxide, 0.11 parts carbon tetrabromide, 0.75 parts of a 26% solids mixture of 4-acryloxy benzophenone in ethyl acetate, 0.097 parts of IRGANOX 1010 (tetrakis(methylene(3,5 di-tert-butyl-4-hydroxyhydrocinnamate))methane) (Ciba Specialty Chemicals, Tarrytown, N.Y.). The core material was polymerized as described in Example 1 of U.S. Pat. No. 5,753,768 incorporated herein by reference. The resulting blend had an intrinsic viscosity of about 0.61 deciliters/gram, Mw of $2.7\times10^5$ g/mol and Mn of $1.5\times10^4$ g/mol. The blend was further mixed with expandable microspheres (F80D, Pierce-Stevens Co., Buffalo, N.Y.) in an 18 mm co-rotating twin screw extruder equipped with several forward kneading, reverse kneading and self-wiping screw elements. A screw speed of 100 RPM was used resulting in a flow rate of approximately 2.3 kg/hr. A flat barrel profile of 107° C. was used with hose and die temperatures set at 177° C. The acrylic composition was softened using a Dynatec Gridmelter set at 177° C. and then fed into the first zone of the extruder. A copolymer of 2-ethylhexylacrylate/dimethyl aminoethylmethacrylate (2EHA/DMAEMA 40/60) (referred to herein as "PIC") in a solution of 67% phthalate plasticizer n-butyl benzyl (Santicizer 160, Ferro Corp., Bridgeport, N.J.) was metered into the second zone of the extruder using a Zenith gear pump at a rate of 2 parts of PIC per hundred parts of acrylic composition. The expandable microspheres were metered into the fourth zone of the extruder using a Ktron T20 feeder at rate of 45 g/hr. The extrudate was pumped through a rotary rod die operated at 177° C. to cast a foam having a thickness of approximately 635 microns onto a silicone-coated paper liner wrapped around a 7° C. chill roll at a speed of approximately 0.6–0.9 meters/min. (Rohm & Haas Co., Philadelphia, Pa.).

The foam was then laminated to two pressure-sensitive adhesives: PSA-1 and PSA-2, one on each side of the foam. PSA-1 is a blend of 95.5% isooctylacrylate and 4.5% acrylic acid polymerized with 1.4% Triton X-200 and t-dodecyl mercaptan as the chain transfer agent. The polymerized composition was dried and dissolved into a 70% heptane/30% isopropyl alcohol blend at 22% solids. PSA-2 is a blend of 89.5% isooctylacrylate, 10% acrylonitrile and 10.5% acrylic acid polymerized with 1.5% sodium dodecylbenzene sulfonate (SIPONATE DS-10 Rhodia Inc., Cranberry, N.J.) and carbon tetrabromide as the chain transfer agent. The polymerized composition was dried and dissolved into a 60% heptane/31% toluene/9% isopropyl alcohol blend at 25% solids. Each of the two PSA's were solvent cast onto a silicone-coated paper liner and then dried resulting in a 50 micron thick adhesive. The foam core was then transfer coated with PSA-1 followed by transfer coating of PSA-2 to the foam core, resulting in a double-coated foam tape.

Example 2

A double-sided pressure sensitive adhesive tape was produced as in Example 1 except the PIC was metered into the extruder at a rate of 4 parts of PIC per hundred parts of acrylic composition to increase the degree of crosslinking and the tensile strength of the foam.

Example 3

A double-sided pressure sensitive adhesive tape was produced as in Example 1 except the PIC was metered into the extruder at a rate of 6 parts of PIC per hundred parts of acrylic composition to increase the degree of crosslinking and the tensile strength of the foam.

Comparative Example C1

A double-sided pressure sensitive adhesive tape was produced as in Example 1 except no PIC was used. The foam had relatively low tensile strength and poor anchorage to PSA-2.

TABLE 1

| Example | PIC conc. (pph) | Adhesive Anchorage (PSA-1 to core) | Adhesive Anchorage (PSA-2 to core) | Foam Core Density ($g/cm^2$) | Static Shear (min) | Tensile Stress ($kg/cm^2$) | Tensile Strain (%) |
|---|---|---|---|---|---|---|---|
| C1 | 0 | Pass | Fail | 0.5635 | 154 | 23.5 | 2500+ |
| 1 | 2 | Pass | Pass | 0.5939 | 702 | 31.6 | 2500+ |
| 2 | 4 | Pass | Pass | 0.6091 | 4717 | 37.3 | 417 |
| 3 | 6 | Pass | Pass | 0.6127 | 10,000+ | 48.2 | 317 |

The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

All publications, patents, and patent applications mentioned herein are hereby incorporated herein by reference.

We claim:

1. A double-sided foam tape, the foam tape comprising:

a foam core having first and second opposed surfaces, the foam core comprising an acidic polymer derived from a first group of monomers comprising at least one acidic monomer, and a basic polymer derived from a second group of monomers comprising at least one basic monomer;

a first pressure sensitive adhesive applied to the first surface of the foam core; and a second pressure sensitive adhesive applied to the second surface of the foam core *wherein the first pressure sensitive adhesive and the second pressure sensitive adhesive are different*.

2. The double-sided foam tape of claim 1, wherein the acidic polymer is a homopolymer and the basic polymer is a copolymer.

3. The double-sided foam tape of claim 1, wherein the acidic polymer is a copolymer and the basic polymer is a homopolymer.

4. The double-sided foam tape of claim 1, wherein the acidic polymer is a copolymer and the basic polymer is a copolymer.

5. The double-sided foam tape of claim 1, wherein the first and second pressure sensitive adhesives do not substantially adhere to one another.

6. The double-sided foam tape of claim 1, wherein at least one of the first and second group of monomers comprises at least one (meth)acrylate monomer.

7. The double-sided foam tape of claim 1, wherein each of the first and second group of monomers comprises at least one (meth)acrylate monomer.

8. The double-sided foam tape of claim 1, wherein the first group of monomers comprises at least one basic monomer.

9. The double-sided foam tape of claim 1, wherein the second group of monomers comprises at least one acidic monomer.

10. The double-sided foam tape of claim 1, wherein the first group of monomers is essentially free of basic monomers.

11. The double-sided foam tape of claim 1, wherein the second group of monomers is essentially free of acidic monomers.

12. The double-sided foam tape of claim 1, wherein the basic monomer is selected from the group consisting of N,N-dimethylaminopropyl methacrylamide (DMAPMAm), N,N-diethylaminopropyl methacrylamide (DEAPMAm), N,N-dimethylaminoethyl acrylate (DMAA), N,N-diethylaminoethyl acrylate (DEAEA), N,N-dimethylaminopropyl acrylate (DMAPA), N,N-diethylaminopropyl acrylate (DEAPA), N,N-dimethylaminoethyl methacrylate (DMAEMA), N,N-diethylaminoethyl methacrylate (DEAEMA), N,N-dimethylaminoethyl acrylamide (DMAEAm), N,N-dimethylaminoethyl methacrylamide (DMAEMAm), N,N-diethylaminoethyl acrylamide (DEAEAm), N,N-diethylaminoethyl methacrylamide (DEAEMAm), 4-(N,N-dimethylamino)-styrene (DMAS), 4-(N,N-diethylamino)-styrene (DEAS), N,N-dimethylaminoethyl vinyl ether (DMAEVE), N,N-diethylaminoethyl vinyl ether (DEAEVE), vinylpyridine, vinylimidazole, and mixtures thereof.

13. The double-sided foam tape of claim 1, wherein the acidic monomer is selected from the group consisting of an ethylenically unsaturated carboxylic acid, an ethylenically unsaturated sulfonic acid, an ethylenically unsaturated phosphonic acid, and mixtures thereof.

14. The double-sided foam tape of claim 1, wherein at least one of the first and second group of monomers comprises a vinyl monomer.

15. The double-sided foam tape of claim 1, wherein the second group of monomers comprises greater than 15% by weight of basic monomers.

16. The double-sided foam tape of claim 4, wherein one of the acidic copolymer and the basic copolymer comprises up to about 5% by weight of the blend.

17. The double-sided foam tape of claim 1, wherein the first pressure sensitive adhesive comprises acrylic acid.

18. The double-sided foam tape of claim 1, wherein the second pressure sensitive adhesive comprises acrylic acid and acrylonitrile.

19. A double-sided foam tape, the foam tape comprising:

a foam core having first and second opposed surfaces;

a first pressure sensitive adhesive applied to the first surface of the foam core, the first pressure sensitive adhesive comprising acrylic acid; and a second pressure sensitive adhesive applied to the second surface of the foam core, the second pressure sensitive adhesive comprising acrylic acid and acrylonitrile;

wherein the first and second pressure sensitive adhesives do not substantially adhere to one another; and wherein the foam core is configured to bond to the first pressure sensitive adhesive and the second pressure sensitive adhesive*, and wherein the first pressure sensitive adhesive and the second pressure sensitive adhesive are different*.

20. The double-sided foam tape of claim [16] *19*, wherein the foam core comprises an acidic copolymer derived from a first group of monomers comprising at least one acidic monomer, and a basic copolymer derived from a second group of monomers comprising at least one basic monomer.

21. The double-sided foam tape of claim [16] *19*, wherein at least one of the first and second group of monomers comprises a vinyl monomer.

22. The double-sided foam tape of claim [16] *19*, wherein each of the first and second group of monomers comprises at least one (meth)acrylate monomer.

23. The double-sided foam tape of claim [17] *20*, wherein the acidic monomer is selected from the group consisting of an ethylenically unsaturated carboxylic acid, an ethylenically unsaturated sulfonic acid, an ethylenically unsaturated phosphonic acid, and mixtures thereof.

24. The double-sided foam tape of claim [17] *20*, wherein the basic monomer is selected from the group consisting of N,N-dimethylaminopropyl methacrylamide (DMAPMAm), N,N-diethylaminopropyl methacrylamide (DEAPMAm), N,N-dimethylaminoethyl acrylate (DMAA), N,N-diethylaminoethyl acrylate (DEAEA), N,N-dimethylaminopropyl acrylate (DMAPA), N,N-diethylaminopropyl acrylate (DEAPA), N,N-dimethylaminoethyl methacrylate (DMAEMA), N,N-diethylaminoethyl methacrylate (DEAEMA), N,N-dimethylaminoethyl acrylamide (DMAEAm), N,N-dimethylaminoethyl methacrylamide (DMAEMAm), N,N-diethylaminoethyl acrylamide (DEAEAm), N,N-diethylaminoethyl methacrylamide (DEAEMAm), 4-(N,N-dimethylamino)-styrene (DMAS), 4-(N,N-diethylamino)-styrene (DEAS), N,N-dimethylaminoethyl vinyl ether (DMAEVE), N,N-diethylaminoethyl vinyl ether (DEAEVE), vinylpyridine, vinylimidazole, and mixtures thereof.

25. The double-sided foam tape of claim [17] *20*, wherein the first and second pressure sensitive adhesives do not substantially adhere to one another.

26. A double-sided foam tape, the foam tape comprising:

a foam core having first and second opposed surfaces, the foam core comprising an acidic copolymer derived from a first group of monomers comprising at least one acidic monomer, and a basic copolymer derived from a second group of monomers comprising at least one basic monomer;

a first pressure sensitive adhesive applied to the first surface of the foam core, the first pressure sensitive adhesive comprising acrylic acid; and a second pressure sensitive adhesive applied to the second surface of the foam core, the second pressure sensitive adhesive comprising acrylic acid and acrylonitrile;

wherein the first and second pressure sensitive adhesives do not substantially adhere to one another *and wherein the first pressure sensitive adhesive and the second pressure sensitive adhesive are different*.

27. The double-sided foam tape of claim [23] *26*, wherein the acidic monomer is selected from the group consisting of an ethylenically unsaturated carboxylic acid, an ethylenically unsaturated sulfonic acid, an ethylenically unsaturated phosphonic acid, and mixtures thereof.

28. The double-sided foam tape of claim [23] *26*, wherein the basic monomer is selected from the group consisting of N,N-dimethylaminopropyl methacrylamide (DMAPMAm), N,N-diethylaminopropyl methacrylamide (DEAPMAm), N,N-dimethylaminoethyl acrylate (DMAA), N,N-diethylaminoethyl acrylate (DEAEA), N,N-dimethylaminopropyl acrylate (DMAPA), N,N-diethylaminopropyl acrylate (DEAPA), N,N-dimethylaminoethyl methacrylate (DMAEMA), N,N-diethylaminoethyl methacrylate (DEAEMA), N,N-dimethylaminoethyl acrylamide (DMAEAm), N,N-dimethylaminoethyl methacrylamide (DMAEMAm), N,N-diethylaminoethyl acrylamide (DEAEAm), N,N-diethylaminoethyl methacrylamide (DEAEMAm), 4-(N,N-dimethylamino)-styrene (DMAS), 4-(N,N-diethylamino)-styrene (DEAS), N,N-dimethylaminoethyl vinyl ether (DMAEVE), N,N-diethylaminoethyl vinyl ether (DEAEVE), vinylpyridine, vinylimidazole, and mixtures thereof.

* * * * *